(12) United States Patent
Schmidt et al.

(10) Patent No.: US 9,066,464 B2
(45) Date of Patent: Jun. 30, 2015

(54) MOVING GEOFENCE FOR MACHINE TRACKING IN AGRICULTURE

(75) Inventors: Lee A. Schmidt, Newton, KS (US); Lorenz Riegger, Riedhausen (DE)

(73) Assignee: AGCO Corporation, Duluth, GA (US)

( * ) Notice: Subject to any disclaimer, the term of this patent is extended or adjusted under 35 U.S.C. 154(b) by 19 days.

(21) Appl. No.: 13/415,903

(22) Filed: Mar. 9, 2012

(65) Prior Publication Data
US 2012/0259537 A1 Oct. 11, 2012

Related U.S. Application Data

(60) Provisional application No. 61/451,248, filed on Mar. 10, 2011.

(51) Int. Cl.
*H04W 4/02* (2009.01)
*G05D 1/02* (2006.01)
*A01B 69/00* (2006.01)
*A01B 79/00* (2006.01)

(52) U.S. Cl.
CPC ............ *A01B 79/005* (2013.01); *A01B 69/00* (2013.01); *G05D 1/0274* (2013.01); *G05D 1/0278* (2013.01); *G05D 1/0289* (2013.01); *G05D 2201/0201* (2013.01); *H04W 4/021* (2013.01)

(58) Field of Classification Search
CPC ..... H04W 4/021; A01B 69/00; A01B 79/005; G05D 1/0274; G05D 1/0278; G05D 1/0289; G05D 2201/0201
USPC ................... 701/426, 517, 300–302
See application file for complete search history.

(56) References Cited

U.S. PATENT DOCUMENTS

| 7,392,132 | B2 * | 6/2008 | Matsuo .................... 701/517 |
| 7,647,166 | B1 * | 1/2010 | Kerns ..................... 701/412 |
| 8,531,293 | B2 * | 9/2013 | Putz ...................... 340/541 |
| 2005/0159883 | A1 * | 7/2005 | Humphries et al. ........ 701/207 |
| 2005/0197771 | A1 * | 9/2005 | Seick et al. .............. 701/301 |
| 2006/0014489 | A1 | 1/2006 | Fitzner et al. |
| 2007/0115101 | A1 * | 5/2007 | Creekbaum et al. ...... 340/426.22 |
| 2007/0288294 | A1 | 12/2007 | Olsen, III et al. |
| 2008/0242335 | A1 | 10/2008 | Fitzner et al. |
| 2009/0037096 | A1 | 2/2009 | Senneff |
| 2009/0140886 | A1 | 6/2009 | Bender |
| 2009/0216406 | A1 | 8/2009 | Senneff |
| 2011/0153143 | A1 | 6/2011 | O'Neil |
| 2012/0209457 | A1 * | 8/2012 | Bushnell .................. 701/13 |

* cited by examiner

*Primary Examiner* — Helal A Algahaim
*Assistant Examiner* — Nga X Nguyen

(57) ABSTRACT

An agricultural vehicle tracking system provides a moving geofence about the location of a vehicle. When the moving geofence contacts a point of interest, such as another moving geofence, an alert is issued. The particular characteristics of the moving geofence may be generated in accordance with a predetermined scheme.

6 Claims, 7 Drawing Sheets

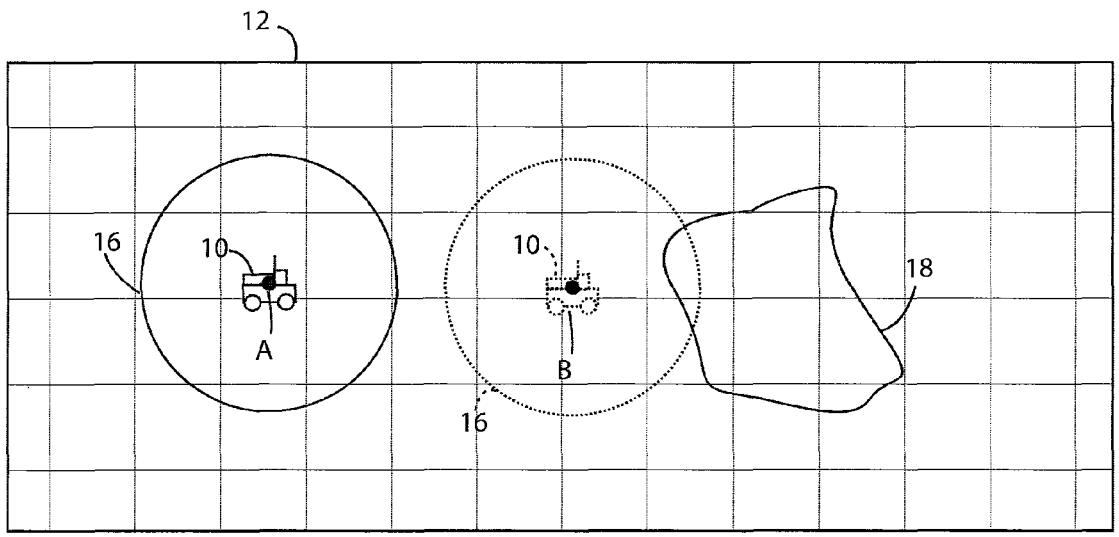
FIG. 1
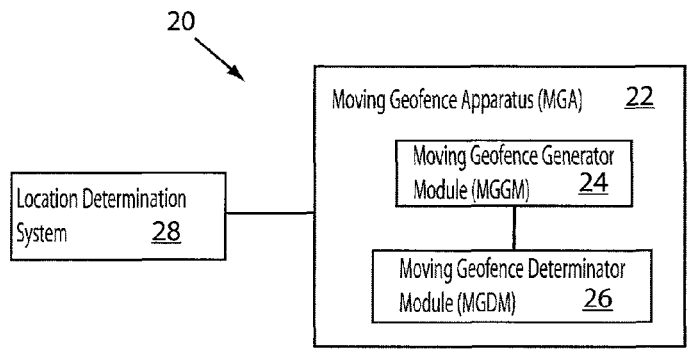
FIG. 2
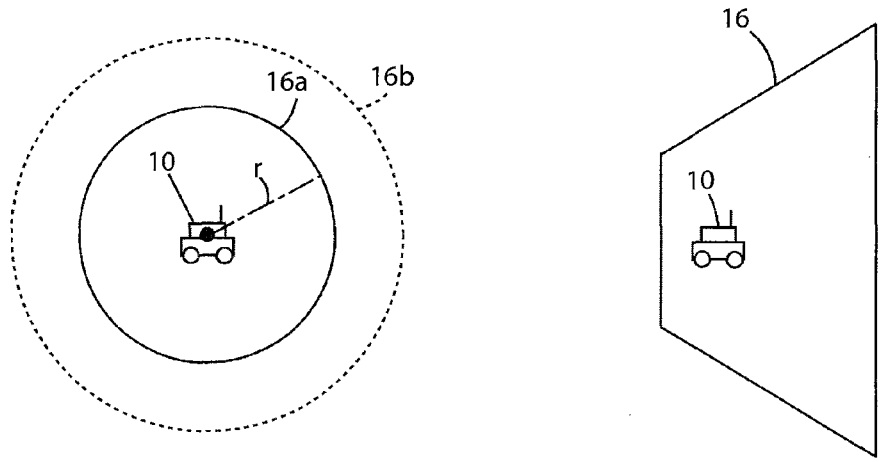
FIG. 3
FIG. 4

MOVING GEOFENCE FOR MACHINE TRACKING IN AGRICULTURE

CROSS REFERENCE TO RELATED APPLICATION

This application claims priority to U.S. Provisional Application 61/451,248 filed Mar. 10, 2011 entitled "Moving Geofence for Machine Tracking in Agriculture" which is incorporated herein by reference in it's entirety.

FIELD OF THE INVENTION

Embodiments of the present invention relate to systems and methods for managing agricultural vehicles. More particularly, embodiments of the present invention relate to systems and methods for improving the efficiency of agricultural vehicles by generating alerts when a vehicle is proximate a point of interest.

BACKGROUND

It is often desirable to determine whether an agricultural machine is in proximity to a point of interest. In prior art tracking arrangements a stationary geofence would be created about a point of interest and if a tracked vehicle crossed the stationary geofence, then an alert would issue. While such systems are suitable for their intended purpose, they have several drawbacks, due at least in part to their reliance upon a stationary geofence. For example, there may be points of interest that, like the machine being tracked, are mobile. For example, it may be desirable to determine the proximity of a moving agricultural vehicle with another moving agricultural vehicle, weather pattern, or the like. In addition, such prior art systems often lack the ability to identify the particular points of interest and provide an intelligent alert that considers characteristics of the machine being tracked and/or the point of interest.

BRIEF DESCRIPTION OF THE DRAWINGS

FIG. 1 is a schematic diagram illustrating a moving geofence system constructed in accordance with an example embodiment of the invention.

FIG. 2 shows an example embodiment of an apparatus for generating a moving geofence about a vehicle location.

FIG. 3 shows an example embodiment of multiple moving geofences generated about a vehicle location.

FIG. 4 shows an example embodiment of a non-uniform moving geofence generated about a vehicle location.

OVERVIEW

Figure 5:
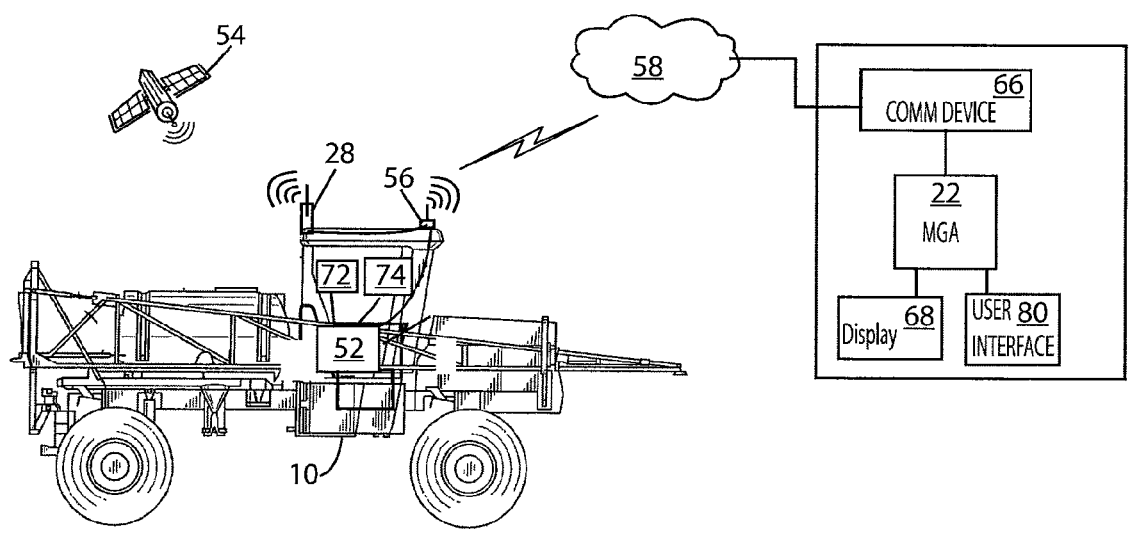
FIG. 5 shows an example embodiment of a moving geofence vehicle tracking system.

In an example embodiment, a moving geofence is generated about the location of a machine to be tracked. The moving geofence may take the form of a virtual fence that can then be used to trigger events, alarms, messages, etc. based upon the location of the moving geofence with respect to a point of interest.

In an example embodiment, a moving geofence apparatus (MGA) is configured to generate a moving geofence (mgf) about a vehicle's location and determine whether the mgf is in contact with a point of interest. The MGA may generate a mgf of a predetermined size about a determined location of the vehicle and determine whether the mgf is in contact with a point of interest. In an example embodiment, the MGA comprises a moving geofence generator module (MGGM) to determine the virtual fence about the vehicle location and a moving geofence determinator module (MGDM) configured to determine whether the virtual fence is in contact with a point of interest.

In an example embodiment, a moving geofence may be generated by generating a virtual area of predetermined shape about a vehicle's present location. For example, using a determined location of a vehicle as a center point, a circle having a radius r may be generated about the vehicle to define the mgf. The size and shape of the mgf may be selected by a predetermined scheme. In addition, multiple mgf's could be generated about the vehicle's location.

The characteristics of the mgf may be determined in accordance with a predetermined scheme. For example, the size and shape of an mgf may depend upon one or more factors, such as the type of vehicle being tracked and the types of point of interest to be monitored. For example, a mgf for a combine harvester may be of a different size and shape than that of a grain cart.

Multiple mgf's may also be generated and may include identifiers to assist other vehicles and systems to identify characteristics of the vehicle. For example, a first weather geofence may be generated about a vehicle to determine whether the vehicle is in contact with a weather point of interest and a second moving geofence may be generated for determining whether the machine is in contact with a moving geofence of another vehicle.

Once the one or more mgf's is generated about the vehicle's location, the MGDM may determine whether the mgf is in contact with a point of interest. By way of example and not limitation, a point of interest may be a moving geofence of another vehicle or a weather pattern, or a stationary geofence about a landmark, obstacle, etc. For example, in addition to the mgf for the vehicle being tracked, the MGDM may track mgf's of other vehicles and weather patterns, as well as various stationary geofences that may be stored in memory or otherwise provided to the MGDM. In the event the mgf is in contact with one of these points of interest the MGDM may issue an alert.

In addition to the MGA, a communications arrangement may be provided to assist in obtaining location information and providing alert signals at the tracked vehicle. For example, a location determination device (LDD) may comprise a vehicle-mounted location system such as a GPS system commonly employed in the agricultural field to determine a location of the vehicle. The MGA may be a remote system located at a remote office. To facilitate communication between the LDD, the MGA, and the vehicle, a field communications device may be provided at the vehicle to receive location information from an LDD and provide the location information to the MGA and receive alert information from the MGA and provide it to the vehicle. A MGA communications device may be provided at the MGA to receive the location information from the field communications device and provide alert signals from the MGDM to the field communications device.

A controller may be in communication with the field communications device at the vehicle so as to receive the alert signals send from the MGA and generate a response. For example, the controller may be communicatively coupled to the field communications device and various systems and subsystems of the vehicle so as to receive an alert signal sent from the MGA to generate various signals to generate an alert at the vehicle. For example, the controller may effectuate various displays and auditory systems in response to an alert signal to provide the operator of the vehicle with alerts and other information, such as whether the mgf of the vehicle is in contact with a point of interest.

Thus, the communications device at the MGA may transmit instructions, commands, and data, and other signals to the communications device at the vehicle. These signals may then be used by the controller and the various subsystems of the vehicle to perform an action at the vehicle, such as to generate an alert. For example, if the mgf of the vehicle contacts a point of interest then the MGA may send a signal to the vehicle and the controller at the vehicle may cause a message to be generated on a display of the vehicle. As the vehicles location moves through the field, the vehicle's location information may be repeatedly determined by the LDS and a corresponding moving geofence may be continually generated by the MGD such that the mgf moves along with the vehicle through the field.

An example method of the invention includes generating a moving geofence about a vehicle location and determining whether the moving geofence is in contact with a point of interest. The method may further include generating an alert if the mgf is in contact with a point of interest.

DETAILED DESCRIPTION

Turning to the figures wherein like reference numbers represent like elements throughout the several views, FIG. 1 shows a schematic view of a vehicle 10 to be tracked in a field 12. The vehicle 10 moves from an initial geographic location at point A to a second geographic location at point B (shown in dashed lines). A moving geofence (mgf) 16 has been generated about the vehicle's respective locations. A point of interest in the form of a stationary geofence 18 is provided around an obstacle in the field, such as a water barrier. As the vehicle 10 moves through the field 12 the mgf 16 overlaps the stationary geofence 18 so that an alert is issued.

FIG. 2, shows an example embodiment of a system 20 for tracking an agricultural machine by generating and monitoring a mgf generated about the machine's location. In the example embodiment a moving geofence apparatus (MGA) 22 is configured to generate a moving geofence about a machine's location and determine whether the machine is in proximity to a point of interest. In the example embodiment shown in FIG. 2, the MGA 22 includes a moving geofence generator module (MGGM) 24 configured to generate a virtual fence about a determined vehicle location and a moving geofence determinator module (MGDM) 26 configured to determine whether the generated virtual fence is in contact with a point of interest. A location determination device (LDD) 28 may determine the vehicle's location and provide the location information to the MGA 22 for generating the mgf.

In the example shown in FIG. 1, the LDD 28 determines that the vehicle is initially located at location A and provides the location information to the MGGM 16 of the MGA. The MGGM may use the location information to generate a moving geofence 16 about location A. In this example embodiment, the mgf 16 is in the form of a circle of radius r having the vehicle's location A as a center point. As the vehicle moves to position B (shown in dashed lines) the new location is determined by the LDD and provided to the MGGM 24 and the MGGM generates an updated a mgf 16 about location B. Thus, for each determined location n of the vehicle 10, a resulting mgf $16n$ may be generated. In this way, the mgf 16 moves with the vehicle as the vehicle moves through the field.

Although the mgf 16 shown in FIG. 1 is in the form of a circle, the particular characteristics of the mgf 16 may be determined in accordance with a predetermined scheme. For example, the MGGM 24 may be provided with a predetermined scheme to generate a mgf of a particular size and shape depending upon particular factors, such as the type of vehicle being tracked or the particular points of interest that may be of interest for the vehicle. To assist the MGGM in generating the mgf additional information may be provided to the MGGM from various inputs. For example, an identifier may be provided to the MGGM that identifies the type of machine being tracked or other characteristics about the machine. Furthermore, as shown in FIG. 3 more than one mgf may be generated for a vehicle 10. For example, under one scheme, a first mgf is determined as a circle extending from the location of the vehicle, the circle having a radius r defined as the distance the vehicle may travel at top speed in a particular time period. This mgf $16a$ may be used as a collision mgf to assist the vehicle in colliding with another vehicle. A second mgf $16b$ may have a larger radius and be used for determining proximity with other points of interest such as a weather pattern or the like. In addition, as shown in FIG. 4, the mgf 16 may be of a non-uniform shape and not centered about the vehicle location. For example, the mgf may extend further in the direction of travel of the vehicle than a direction of non-travel.

Turning back to FIG. 2, the MGGM 24 may be in the form of hardware, software, and/or firmware and configured to take location information about a vehicle and additional identification or other information and generate a mgf in accordance with a predetermined scheme. In an example embodiment the MGGM 24 comprises a processor (not shown) for executing instructions, such as a predetermined scheme, and a memory (not shown) for storing data and instructions for execution by the processor.

The particular scheme employed by the MGGM 24 may be selected by a user. For example, a user interface (not shown) may be provided to allow a user to input or select a particular scheme to determine the various sizes and shapes of the mgf. The scheme could take various factors into account in generating the mgf, such as the type of vehicle being tracked, the speed of the vehicle, the direction of travel of the vehicle, etc. in determining the size and shape of the mgf.

With the mgf 16 generated, the MGDM 26 may determine whether the vehicle is proximate a point of interest by determining whether the geographic location of the vehicle, as determined by the mgf overlaps with a geofence of a point of interest. For example, the MGDM 26 may include stored coordinates for stationary geofences, such as the geofence 18 in FIG. 1 and for mgf's the MGGM 24 may receive location information about other mobile points of interest and provide associated mgf's to the MGDM 26. These various stationary geofences and mgf's may be placed on a mathematical or virtual mapping and if there is an overlap, such as the overlap of the mgf 16 of vehicle 10 when at point B with the geofence 18 of the obstacle, then the MGDM 26 may issue an alert. An alert may be any action that is reasonably calculated to inform a user that the vehicle 10 is proximate a point of interest. As mentioned above, the various points of interest could be represented by a stationery geofence other mgf's.

The MGDM 26 may be hardware, software, firmware, or a combination thereof. In an example embodiment, the MGDM 26 may comprise a processor (not shown) for executing instructions and a memory (not shown) for storing data, such as instructions for execution by the processor. For teaching purposes the MGGM 24 and the MGDM 26 are shown as separate components but they could be combined into one component or form part of another component.

To provide location information and other information, such as identification information, to the MGA 22 and to provide alerts at a vehicle, in one example embodiment, the MGA 22 and LDD 28 communicate over a communications network. FIG. 5 shows an mgf system 50 in which a vehicle 10 is tracked. Although shown in the example embodiment as an agricultural sprayer, the vehicle 50 may be a combine, tractor, semi-trailer truck, or various other vehicles. Furthermore, in lieu of a vehicle, an implement or other apparatus may be tracked. As discussed in more detail below, the vehicle 10 may comprise various systems and subsystems that enhance the functionality of the vehicle. For example, the vehicle may include a controller 52 that communicates with various vehicle systems and subsystems such as various displays, engine subsystems, location-determining subsystems, and the like as described in more detail below.

A location detection device (LDD) 28 may be provided at the vehicle 10 to determine the vehicle's geographic location. The LDD 28 may be an electronic device capable of determining geographic locations of the vehicle 10, such as LORAN, VHF omidirectional range (VOR), radio beacons, ultrasonic ranging, or the like. In one embodiment, the LDD 28 is a global positioning system (GPS) receiver capable of determining vehicle geographic locations, heading and speed from various navigation satellites 54. The LDD 22 may further comprise an antenna or other device to improve its navigational abilities.

A communication device 56 may be provided at the vehicle 10 and configured to transmit geographical data gathered by the LDD 28 to the MGA 22. The communication device 56 may be an electronic communication device in communication with and configured for sending various data to the MGA 22. The communication device 56 may be a radio transceiver, or any other device capable of sending and receiving data over a distance. In one embodiment, the communication device 56 is an ethernet adapter capable of connecting with an internet gateway, such as a router. For example, the communication device 56 may include a radio transmitter, a Bluetooth-compatible transmitter, a Wi-Fi/802.11-compatible transmitter, or any other device capable of transmitting data over a distance and a receiver for receiving data over a distance. In one embodiment, the communication device 24 is a wireless modem capable of connecting to the Internet.

The communication device 56 is communicatively coupled to the LDD 28 to receive geographical information from the LDD 28 and configured to communicate such location information over a network 58 to a MGA communications device 66 at the MGA 22. The communication device 56 may also be configured to send identification information and other information to the MGA 22. For example, the communication device could send a data string that includes both geographical information and identification information or other information to the MGA 22. The communication device 66 may also be configured to receive various data from the network sent from the MGA and provide the data to the controller 52 at the vehicle 10.

The MGA communications device 66 may be located at the MGA 22 and configured to receive the geographic and other information sent from the field communications device 56 over the network 58 and provide the information to the MGA 22. The MGA communication device 66 may also be configured to send alert information to the field communication device 56 over the network 58. The MGA communications device 66 at the MGA 16 may be a radio transceiver, or any other device capable of sending and receiving data over a distance. In one embodiment, the communication device 66 is an ethernet adapter capable of connecting with an internet gateway, such as a router. The field communication device 56 may then provide the alert information to the controller 52.

While in the example embodiment of FIG. 5, the MGA 22 was shown in a remote location, such as at a data center, a back office, or the like, and communicating over a network 28 with an LDD 28 located at the vehicle 10, in other embodiments, the MGA 22 could be located at the vehicle 10 itself and communicate directly with the LDD 28 and controller 52.

In one embodiment, the communication device 56 associated at the vehicle 10 connects with the MGA communication device 66 associated with the MGA 22 over the internet using the TCP/IP protocol and uploads compressed location and identification data using the HTTP protocol. In turn, the MGA communication device 66 receives the compressed location and identification data and provides the data to the MGGM 24. The MGGM 24 generates a moving geofence 16 for the vehicle 10, based at least partially on the location data. This mgf 16 may then be provided to the MGDM 26 which compares the boundary of the mgf 16 to various points of interest.

If the mgf 16 contacts a point of interest then the MGDM 52 is operable to generate an alert. An alert may be any action to inform a user that the vehicle 10 is in proximity to a point of interest. In one example embodiment, the MGDM 24 may be operable to generate an alert at the remote location of the MGA 22. For example, a message may be displayed on a display 68 at the remote location.

In addition, an alert may be provided at the vehicle 10. For example, an alert message may be sent from the MGDM 26 to the controller 52 of the vehicle 10 and the controller 52 may trigger an alert at the vehicle 10. For example, an alert may be in the form of a signal that may be sent from the MGDM 26 to the MGA communication device 66 and over the network 58 to the field communication device 56 at the vehicle 10. The vehicle communication device 56 may be communicatively coupled to the controller 52 and provide the alert information to the controller 52. The controller 52 may in turn generate an alarm at the vehicle.

For example, the controller, 52 may be coupled with various vehicle systems or subsystems over a CAN bus or other vehicle communication network known to one of ordinary skill in the art and issue signals to the various components to generate an alert for the operator of the vehicle 10. For example, the controller 52 may send signals to one or more displays 72 to display alert information to the operator of the vehicle 12 or to one or more speakers 74 to generate an audible alert. The controller 52 may be an electronic processor and associated memory, an application specific integrated circuit (ASIC), a field programmable gate array (FPGA) or any other electronic device capable of performing mathematical and logical operations on data. The controller 52 may additionally comprise or be coupled with various subsystems that augment the functionality of the controller 52 in some meaningful way. For example, the controller 52 may have a persistent storage subsystem capable of storing data when the controller 52 is powered down and it may have a video subsystem capable of presenting information on a video display screen. The controller 52 may also be connected to the various subsystems of the vehicle 10, possibly through a data capture subsystem, to discern various information about the vehicle 10 and provide this information to the field communication device 56 for use by the MGA 22. For example, the controller 52 could provide data as to the type and identification of the vehicle 10.

The particular alert generated may be determined in accordance with a predetermined scheme. For example, the MGDM 26 use characteristics of the vehicle 10 such as the vehicle type, speed, purpose etc. The MGDM may also consider characteristics of the point of interest which the mgf 16 has contacted. For example, an alert issued in response to contact with a weather mgf may be different than an alert associated with a contact with an mgf of another vehicle. For example, if the contact of the mgf is with a known stationary point of interest, such as an obstacle, a message may be displayed showing "You are near [point of interest]." If the point of interest is a moving geofence of another vehicle, the following message may be displayed "COLLISION WARNING: another vehicle is within r feet" where r could be the radius of the geofence. If the contact is with a weather mgf, the following message may be displayed: "WEATHER WARNING: Severe Weather Alert Issued For Your Area."

Figure 6:
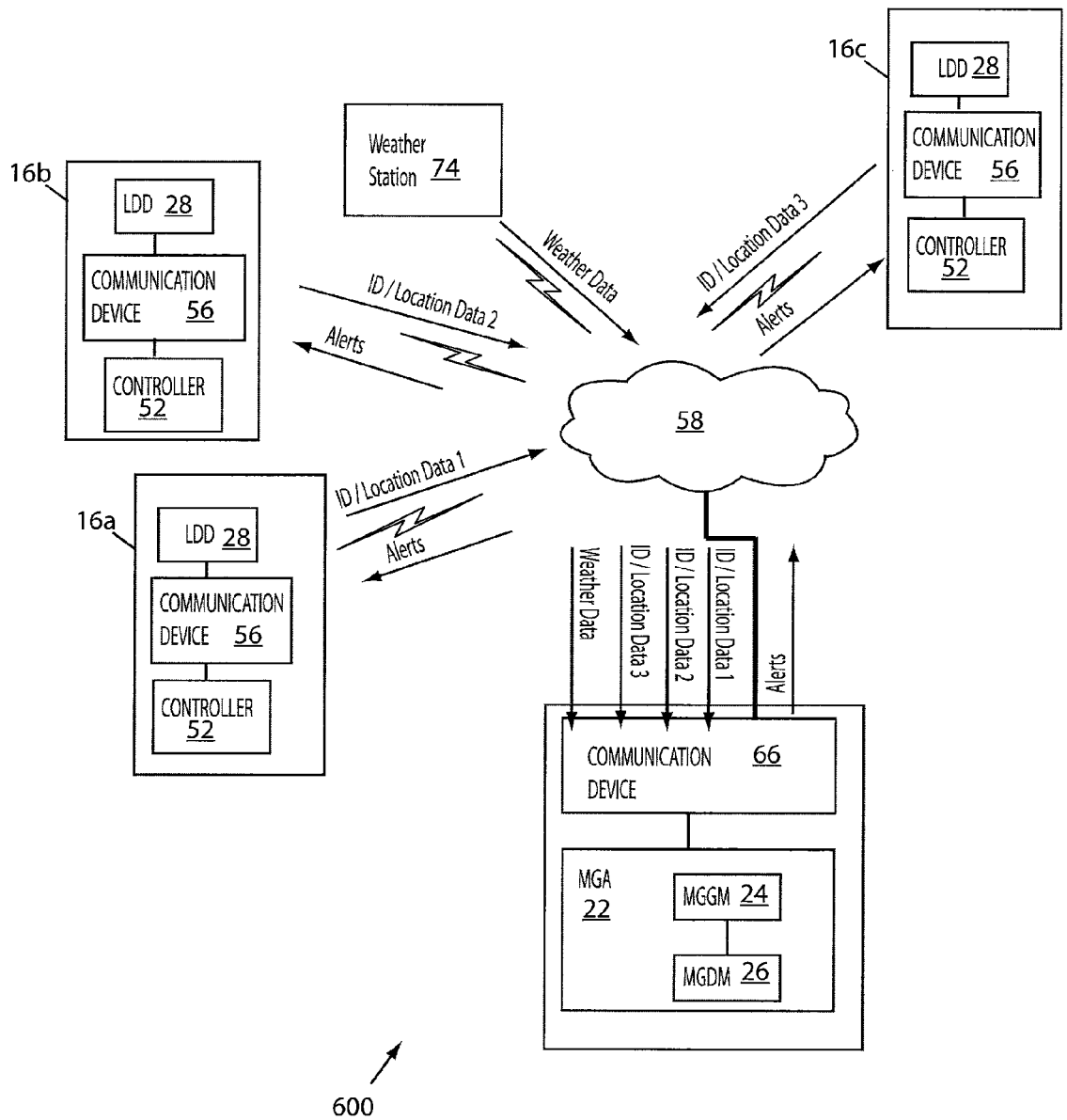
FIG. 6 shows an example embodiment of a moving geofence vehicle tracking system in which multiple vehicle are tracked.

The MGA 22 may track multiple mobile points of interest and their associated mgf's. FIG. 6 shows an example embodiment of a system 600 in which an MGA 22 receives data from a plurality of inputs to generate a plurality of mgf's. In that example, identification and location information associated with three vehicles 10a, 10b, 10c is provided to the MGA 22 over communication network 58. For example, each vehicle 10 includes an LDD 28 for determining location information, a controller 52 for providing identification information, and a field communication device 56 for transmitting the location and identification information over the network 58 to the MGA 22 via the MGA communication device 66. Corresponding mgf's are then generated by the MGGM 24 and appropriate alerts generated by the MGDM 26. The alerts may then be sent from the MGA communication device 66 over the network 58 to the field communication device 56 and on to the controller 52. The controller may then initiate an alert at the vehicle 10.

A weather station 74 may send weather information to the MGA 22 over the network 58 as well. For example, the weather station may generate and send a map of an area for which a weather condition is active, such as rain, a sever weather warning, freezing temperatures, etc. The MGA 22 may then generate a mobile or stationary weather geofence using the weather data.

In addition to providing location information to the MGA, the communication device may also provide additional information such as vehicle identification and characteristics. For example, the communication devices 56 may send data identifying the vehicle as a combine, windrower, or grain cart. This information may be used by the MGGM 24 to generate one or more mgf's in accordance with a predetermined scheme. For example, the MMGM 24 may generate a weather mgf and a vehicle collision mgf about the location of a combine, but only a single mgf may be generated about a grain cart. By providing identifying information with the mgf, the MGDM 26 can determine characteristics of the alert to be generated. For example, if two mgf's associated with two combines overlap then a collision alert may be issued for both combines. If a vehicle weather mgf's contacts a weather mgf, then a weather alert may be generated.

FIGS. 7A-7E show a schematic map of a tracking system incorporating mgf's for three vehicles moving through a field 710: a combine 702, a tractor 704 and a grain cart 706. The specific size and shape of these mgf's may be determined by the MGGM 24 in accordance with a particular scheme. For example, the tractor 702 and combine 704 both have inner 712, 714 and outer 722, 724 mgf's generated about the respective geographic locations of their associated vehicles. The inner mgf's 712, 714 may represent and be identified as collision mgf's and the outer mgf's 722, 724 may represent and be identified with a weather mgf. For example, the inner mgf's represent the proximity level associated with detecting another vehicle in order to avoid a collision and the outer mgf's represent a proximity level for a weather event. The grain cart 702, however, may have a single mgf 716 generated about its geographic location 706. The mgf's may broadly comprise a geographic area defined about the respective vehicle locations and define a proximity level about the vehicle. The mgf's may be of various shapes and sizes in accordance with the predetermined scheme employed. For example, the tractor and combine mgf's 712, 714, 722, 724 are of circular shape whereas the grain cart mgf 716 is of square shape. A stationary geofence 720 is also shown that represents the location of an obstacle, such as a building or body of water.

Each of the mgf's 712, 714, 716, 722, 724 and the stationary geofence 720 may define a point of interest comprising a plurality of geographic locations that define a boundary around a particular location. For a stationary point of interest, the associated geographic locations may be stored at the MGA 22, or in a subsystem thereof. For a point of interest represented by a mgf, relevant location data may be continuously be received by the MGA 22 and corresponding mgf's generated. For example, as shown in FIG. 6, identification and location information may be transmitted from the various vehicles and received by the MGA for generating corresponding mgf's.

Figure 7A:
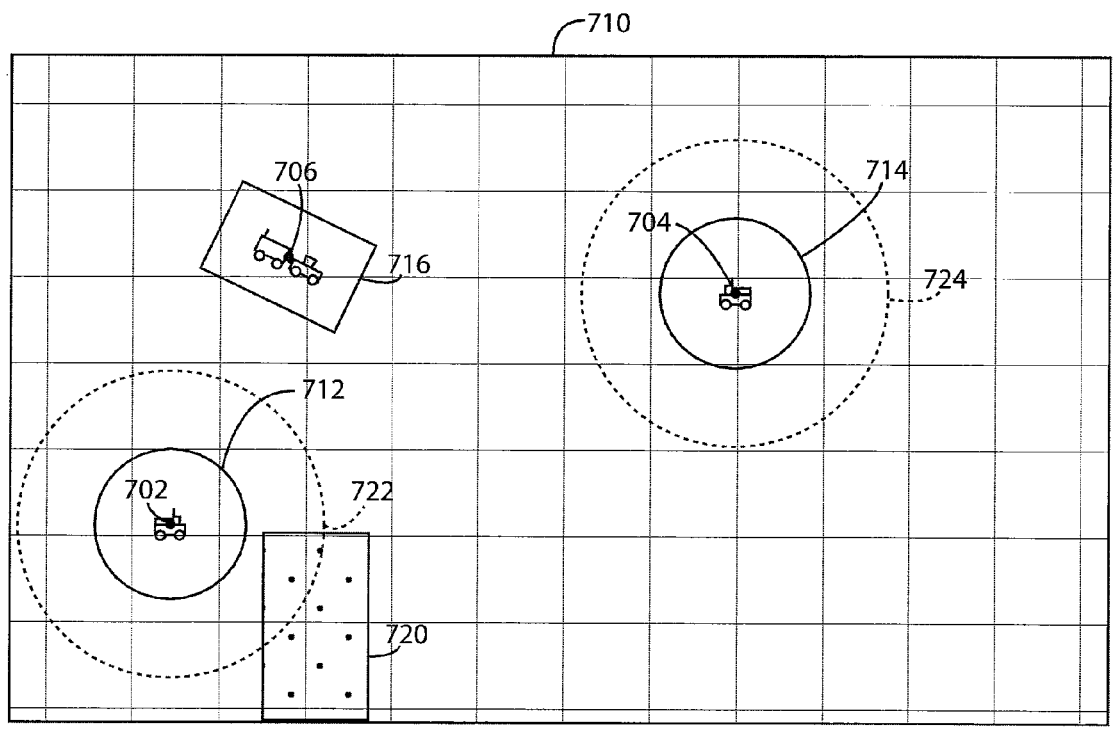
FIGS. 7A-7E show example embodiments of a schematic of tracking vehicles using one or more moving geofences.

In FIG. 7A none of the mgf's are in contact with a point of interest, i.e., none of the mgf's 712, 714, 716, 722, 724 are in contact with each other or the stationary geofence 720. Thus, the MGDM 26 will determine that there is no overlap and no alert will be issued.

Figure 7B:
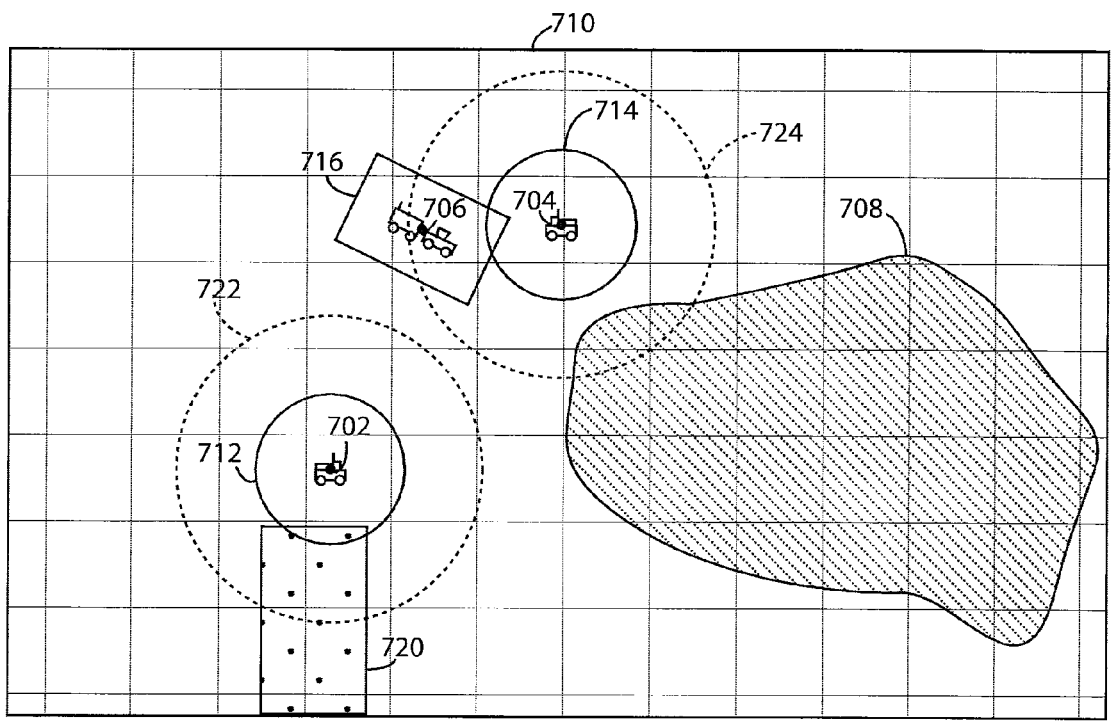

In FIG. 7B, the mgf's have moved to new locations in correspondence with the geographical movement of the vehicles in the field 710. In addition, a weather mgf 708 has been generated that corresponds to a weather pattern provided by a weather station. For example, a weather station 74 (FIG. 6) may generate a weather data that is sent over the network 58 to the MGA 22 for generating a weather mgf 708. In the example embodiment shown in FIG. 7B the weather mgf may correspond to a radar image, but other geographical areas could be used. For example, the mgf may correspond to a geographical area for which a weather warning has been issued.

In FIG. 7B the outer mgf 724 of the tractor 704 overlaps the weather mgf 708. Thus, the MGDM 26 may generate an alert signal that is received by a field communication device 56 of the tractor 704 and provided to a controller 52 of the tractor 704. The controller 52 may then cause a weather alert to be generated at the tractor. For example, the message "WEATHER WARNING" may be displayed on a display 68 of the tractor 704.

Also in FIG. 7B the outer 724 and inner 714 mgf's associated with the tractor location 704 overlap the mgf 716 associated with the grain cart 706. In this instance, identifying information may be provided by a communication device 56 at each vehicle such that the MGDM 26 can identify the particular situation. For example, it may be desirable for a grain cart to be located near a combine but not a tractor, in which case the identity of the particular vehicles in proximity to one another may determine whether a particular alert provided. In this instance, the overlap of the outer mgf 724 of the tractor with the mgf 716 of the grain cart may be ignored as that outer mgf 724 may be used for determining proximity to a weather condition. For example, the MGDM 26 may identify the mgf 716 as coming from a grain cart and specify that the proximity be determined by the inner mgf 14. Because the inner or collision mgf 714 overlaps the mgf 716 of the grain cart, a collision alert may be sent to the associated tractor 704 and grain cart 716. In this case a collision alert, such as "COLLISION WARNING: Grain Cart In Vicinity" may be provided to the operator of the tractor and "COLLISION WARNING: Tractor Near" may be provided to the grain cart. The operators of the vehicle may then take appropriate action to avoid collision.

Also in FIG. 7B, the combine mgf 712 overlaps the stationary geofence 720 associated with an obstacle. In that case an alert may be provided to the combine, such as "WARNING: OBSTACLE NEAR." The operator of the tractor may then make an avoidance maneuver to avoid the obstacle.

Figure 7C:
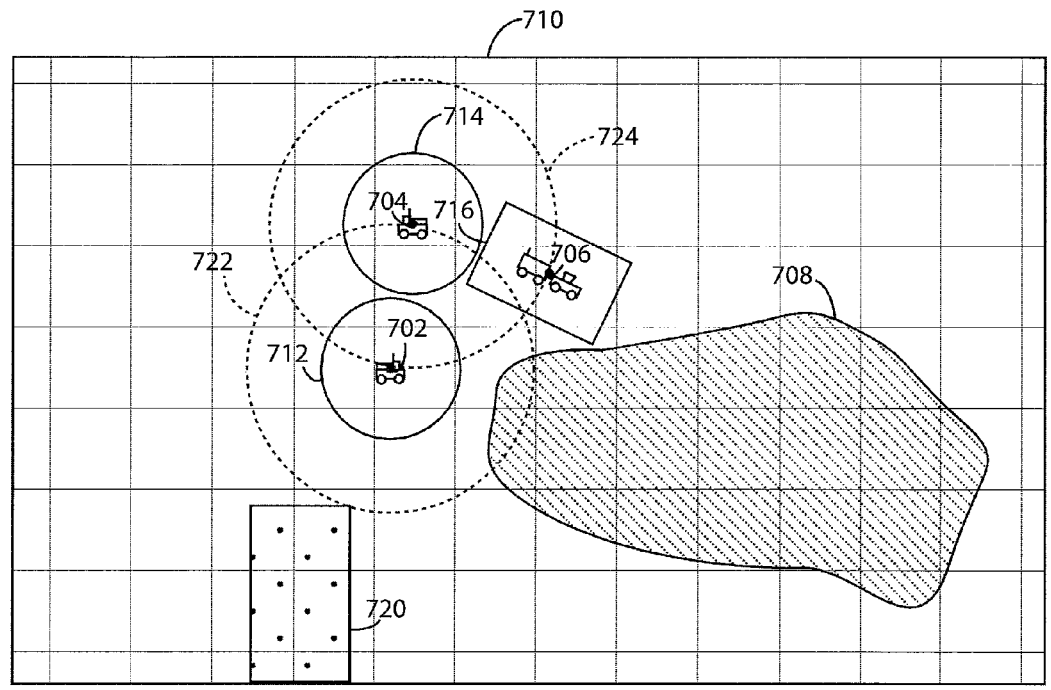

Continuing to FIG. 7C, the grain cart mgf 716 no longer overlaps the mgf 714 of the tractor, the collision mgf 712 no longer overlaps the stationary geofence 720, and the weather mgf 708 no longer overlaps the weather mgf 724 of the tractor 704. Thus, each of the previous alerts may be removed. Now however, the weather mgf 722 of the tractor overlaps the weather mgf 708 of the weather pattern and therefore a weather alert may be provided at the tractor 702.

Figure 7D:
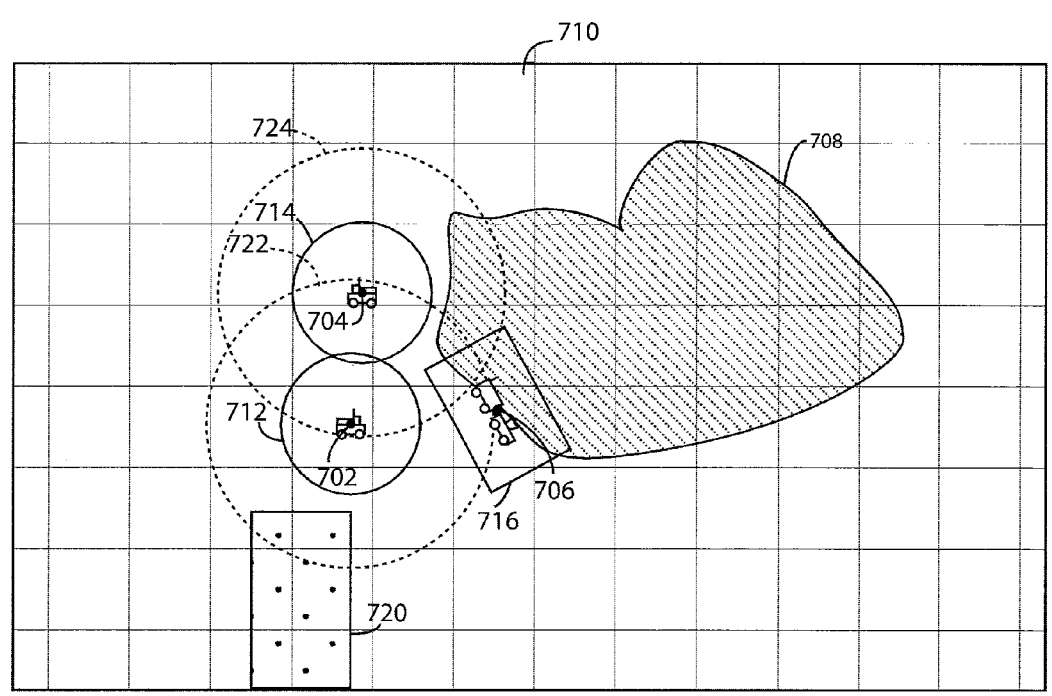

In FIG. 7D, the inner or collision mgfs 712, 714 of the tractor and combine overlap so that a collision message may be sent to each vehicle. Although the weather mgf 708 overlaps the mgf 716 of the grain cart 706 the MGDM 26 may determined that the mgf 716 is for use only with other vehicle mgf's and not a weather mgf.

Figure 7E:
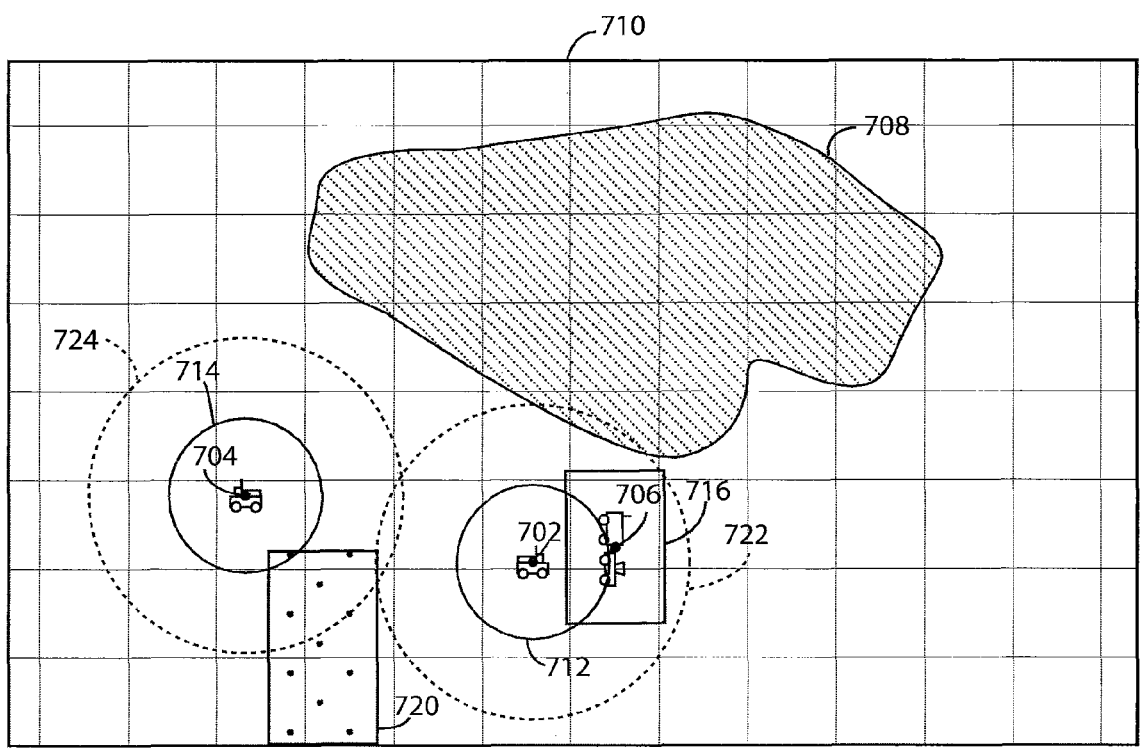

In FIG. 7E the inner or collision mgf 704 overlaps the stationary geofence 720 and an alert may be provided to the tractor. In addition, the weather mgf 708 overlaps the weather mgf 722 of the combine 702 so that a weather alert may be provided to the combine 702. In addition, the collision mgf 702 overlaps the mgf 716 of the grain cart 706. In this case, however, it may be desirable for the two vehicles to be in close proximity, such as for the dumping of grain from the combine into the grain cart, an alert message may be displayed such as "ATTENTION: Grain Cart Near." This may assist the operator in determining that a grain cart is nearby for possible off load of grain collected by the combine. Similarly, the message "ATTENTION: Combine Near" may be provided at the grain cart. These messages may facilitate the operators of the combine and grain cart in collocating to unload the grain from the combine to the grain cart.

Thus, the various alerts provided at the vehicle may take into account characteristics of the particular mgfs and/or stationary geofences which are involved in the overlap. The MGA 26 may be provided with a particular scheme for generating the mgf and for determining an alert using such characteristics. For example, the size and shape of an mgf to be generated and the number of mgf's to be generated for a particular vehicle may be based upon particular characteristics of that vehicle. Likewise, the particular alert generated by an MGA may be determined in accordance with a particular scheme. For example, an alert resulting from an overlap of mgfs between two combines may be different from that resulting from the overlap of a combine and a grain cart.

Figure 8:
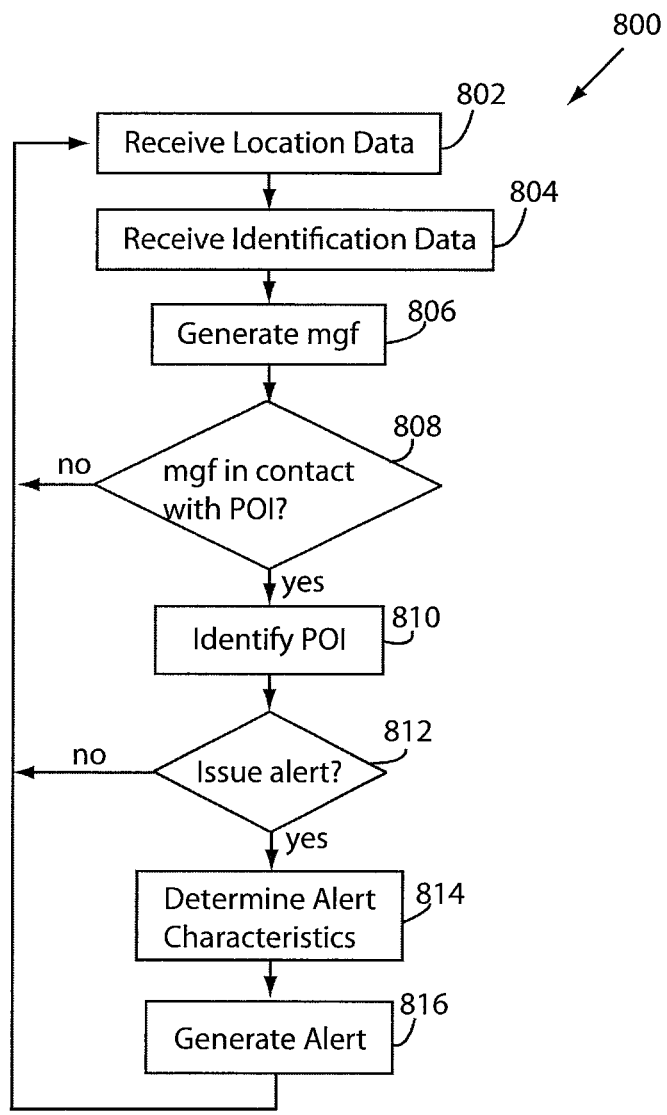
FIG. 8 shows an example method employing a moving geofence.

FIG. 8 shows an example method 800 of the invention. The method 800 broadly comprises receiving location data associated with a vehicle to be tracked, generating a moving geofence using the location data, and determining whether the moving geofence is in contact with a point of interest.

At block 802, data representative of a geographic location of an agricultural vehicle 12, the speed of the vehicle, a heading of the vehicle, or various other data about the vehicle or a subsystem of the vehicle, is received by a communication device, such as by communication device 66. In some embodiments, the data may be compressed and, thus, the data may be decompressed into a more easily useable form. In some embodiments, the data may be further stored, for example in an electronic memory or persistent storage, for later comparison or use.

At block 804 identification information is received. For example, data may be provided that identifies the type of vehicle associated with the location data, such as whether the vehicle is a combine, tractor, grain cart, etc. and other information that may be used by a predetermined scheme of the MGGM 24. It should be noted that the location data and the identification data could be send in the same communication or different communications and simultaneously or at different times. For example, a message sent from the field communication device 56 may include both identification and location information for a vehicle.

At block 806, a moving geofence, may be generated. For example, the location information and identification information may be used by a MGGM 24 to generate a geofence in accordance with a predetermined scheme. The mgf 16 may be calculated in numerous ways. In an embodiment shown in FIG. 1, the location of the vehicle serves as a center point about which a circle having a radius r is generated. As detailed above, different sizes and shapes of the mgf 16 may be generated as desired. For example, a user may input a desired radius for the mgf, a desired shape, etc. using a user interface (FIG. 5).

At block 808 a determination is made as to whether the mgf contacts a point of interest. In one embodiment, the determination can be made by determining whether the mgf 16 overlaps any point of interest. In an example embodiment, this determination is made by the MGDM 26 by comparing an area incorporated by the mgf 16 with the areas covered by other mgfs and geofences.

At block 810 characteristics of the point of interest may be determined. For example, a determination may be as to whether the point of interest is an mgf of another vehicle, and if so, the type of vehicle.

At block 812 a determination is made as to whether to issue an alert in accordance with a predetermined scheme. For example, using the characteristics of the mgf and the point of interest the MGDM may determine whether an alert is in order. For example, if the mgf is intended as a weather proximity mgf and the other mgf is intended as a collision mgf of a vehicle the MGDM may determine an alert is not in order. However, if the mgf is intended for use as a weather mgf and overlaps a weather mgf provided by a weather station an alarm may be appropriate.

At block 814, a determination is made as to the characteristics of the alert to be generated. For example, if the overlaps relates to a weather mgf then a weather alert may be issued or if the mgf relates to a collision proximity then a collision alert may be issued. By way of example and not limitation, the alert may be an e-mail message, a short message service (SMS) message, an instant message (1M), text or graphic displayed on a web page, a message displayed on a computer monitor, a message on a scrolling light emitting diode (LED) message board, a combination thereof, or the like. In one embodiment, the MGC generates an e-mail message and updates text on a web page to alert a user that the vehicle 12 will arrive within a predetermined time interval. Thus, the invention described above advantageously alerts users that a vehicle will arrive at the point-of-interest within a particular time interval. This improves the efficiency of operations by reducing or eliminating vehicle downtime.

In one example embodiment, a message may be generated by the MGA 22 and sent by the communication device 66 to the vehicle 10 where it is received by the communication device 56 and relayed to a controller 52 at the vehicle. The controller 52 may then initiate various alerts at the vehicle in response to the alert message. Although the invention has been described with reference to the embodiments illustrated in the attached drawing figures, it is noted that equivalents may be employed and substitutions made herein without departing from the scope of the invention as recited in the claims.

What is claimed is:

1. A moving geofence system, comprising:
a location determination system for generating location information indicating the location of a vehicle; and
a moving geofence apparatus configured to—
receive the vehicle location information from the location determining system;
generate a first moving geofence for the vehicle using the vehicle location information, the first moving geofence including a plurality of geographic coordinates defining a first geographic area around the vehicle, the moving geofence apparatus configured to generate the first moving geofence by repeatedly generating new geographic coordinates associated with the first moving geofence as the vehicle moves through a geographic area;
determine whether the first moving geofence contacts a first point of interest by placing the first moving geofence and at least one coordinate associated with the first point of interest on a virtual map and determining if the moving geofence overlaps the at least one geographic coordinate,
communicate a first alert to the operator of the vehicle if the first moving geofence contacts the first point of interest,
generate a second moving geofence for the vehicle using the vehicle location information, the second moving geofence including a plurality of geographic coordinates defining a second geographic area around the vehicle that is different than the first geographic area, the moving geofence apparatus configured to generate the second moving geofence by repeatedly generating new geographic coordinates associated with the second moving geofence as the vehicle moves through the geographic area, and
communicate a second alert to the operator of the vehicle if the second moving geofence contacts the second point of interest, the second alert being different than the first alert.

2. The moving geofence system of claim 1, the moving geofence apparatus configured to communicate the first alert only if the first point of interest corresponds to a vehicle.

3. The moving geofence system of claim 2, the moving geofence apparatus configured to communicate the second alert only if the second point of interest corresponds to a weather condition.

4. The moving geofence system of claim 1, the first moving geofence corresponding to a smaller geographic area than the second moving geofence.

5. The moving geofence system of claim 4, the first moving geofence being entirely contained within the second moving geofence.

6. The moving geofence system of claim 4, wherein the moving geofence apparatus is configured to communicate a third alert to the operator of the vehicle if the first moving geofence ceases contact with the first point of interest, the third alert being different than the first alert and the second alert.

* * * * *